United States Patent Office 3,268,334
Patented August 23, 1966

3,268,334
POLYMETHINE DYES
Henri Depoorter, Marcel Jan Libeer, Gerrit Godfried van Mierlo, and Jean Marie Nys, all of Mortsel-Antwerp, Belgium, assignors to Gevaert Photo-Producten N.V., Mortsel-Antwerp, Belgium, a Belgian company
No Drawing. Continuation of application Ser. No. 62,108, Oct. 12, 1960. This application Jan. 30, 1964, Ser. No. 341,446
Claims priority, application Great Britain, Oct. 13, 1959, 34,641/59
11 Claims. (Cl. 96—106)

This application is a continuation of our copending application Serial No. 62,108, filed October 12, 1960, and now abandoned.

This invention relates to new cyanine dye salts and to their preparation and use as sensitizers for photographic silver halide emulsions, and to methods of sensitizing such emulsions by means of such sensitizing dyes.

We have found a new class of cyanine dye salts containing at least one benzimidazole nucleus, wherein at least one of the hydrogen atoms of the benzene ring forming part of said benzimidazole nucleus is substituted by a carbethoxy group.

More particularly we provide new cyanine dye salts represented by the following general formula:

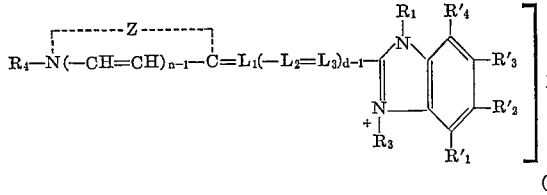

(A)

wherein $R_1$, $R_3$ and $R_4$ each represents a substituent of the type contained in cyanine dyes on the cyanine nitrogen atom e.g. an alkyl group such as methyl, ethyl, propyl, isopropyl, butyl, isobutyl, allyl (vinyl methyl), β-hydroxyethyl, β-acetoxyethyl, sulfoethyl, sulfopropyl, sulfobutyl, propylsulfate, butylsulfate, benzyl (phenyl methyl), carboxybenzyl, the group —A—CO—O—B—SO$_2$—OH wherein A and B have the same significance as set forth in Serial No. 742,713 filed June 18, 1958, which application forms the basis of U.S. Patent No. 3,156,685 such as e.g. omega-acetyl sulfonamido propyl, omega-acetyl sulfonamidobutyl, beta-methylsulfonylamino ethyl, the group —A—W—NH—V—B wherein A, W, V and B have the same significance as set forth in Serial No. 746,347 filed July 3, 1958, now U.S. Patent No. 3,083,220, which application corresponds to British Patent No. 904,332, an aryl radical such as phenyl, carboxyphenyl, etc. (e.g. a mononuclear aryl radical of the benzene series) or a cycloalkyl radical such as cyclohexyl; $L_1$, $L_2$ and $L_3$ each represents a methine group (e.g. =CH—, =C.CH$_3$—, =C.C$_2$H$_5$, =C.C$_3$H$_7$—, =C.CH$_2$C$_6$H$_5$—, =C.C$_2$H$_5$—, =C.O-alkyl—, =C.S-alkyl—, C.Se-alkyl—, =C.O.-acyl—, =C.OO—C$_2$H$_5$—, =C.NHR'—, =C.NHCOR, =C.CONHR) (wherein R and R' are hydrogen or have the same significance as set forth above for $R_1$, $R_3$ and $R_4$), =C.(CH=)$_r$D— (wherein D represents a heterocyclic radical, and r represents 0 or a positive interger from 1 to 6), or a methine group which forms part of a heterocycylic or isocyclic ring such as for example a cyclopentadiene ring; n represents the positive integer 1 or 2; d represents a positive integer from 1 to 4; Z represents the atoms necessary to complete a heterocyclic nitrogen nucleus of the type contained in cyanine dyes such as those of the thiazoline series (e.g. thiazoline,
4-methylthiazoline,
4-hydroxymethyl-4-methylthiazoline,
4-4-bis-hydroxymethylthiazoline,
4-acetoxymethyl-4-methyl-thiazoline,
4,4-bis-acetoxymethylthiazoline, etc.),
those of the selenazoline series,
(e.g. selenazoline),
those of the benzimidazole series
(e.g. 1-ethylbenzimidazole,
1-phenylbenzimidazole,
1-ethyl-5,6-dichlorobenzimidazole,
1-hydroxyethyl-5,6-dichlorobenzimidazole,
1-phenyl-3-acetoxyethyl-5,6-dichlorobenzimidazole,
1-ethyl-5-chlorobenzimidazole,
1-ethyl-5,6-dibromobenzimidazole,
1-ethyl-5-phenylbenzimidazole,
1-ethyl-5-fluorobenzimidazole,
1-ethyl-3-(beta-acetoxyethyl)-5-cyanobenzimidazole,
1-ethyl-3-[N-(methylsulfonyl)-carbamylmethyl]-5-cyano benzimidazole,
1-ethyl-3-(γ-propylsulphate)-5-cyano benzimidazole,
1-ethyl-3-[γ-(acetyl-sulfonamido)-propyl]-5-cyano benzimidazole,
1,3-diethyl-5-chlorobenzimidazole,
1,3-diethyl-5,6-dichlorobenzimidazole,
1-(β-acetoxyethyl)-3-(β-hydroxyethyl)-5-cyanobenzimidazole,
1,3-bis(β-acetoxyethyl)-5-cyano benzimidazole,
1-ethyl-3-[δ-(acetylsulfonamido)-butyl]-5-cyano benzimidazole,
1-ethyl-3-(β-hydroxyethyl)-5-cyano benzimidazole,
1,3-diethyl-5-chloro-6-cyano benzimidazole,
1,3-diethyl-5-fluoro-6-cyano benzimidazole,
1,3-diethyl-5-cyano-benzimidazole,
1-ethyl-3-(β-acetoxyethyl)-5-fluorobenzimidazole,
1-ethyl-3-[δ-(acetylsulfonamido)-butyl]-5-fluoro-benzimidazole,
1-ethyl-5-acetyl-benzimidazole,
1-ethyl-3-(β-hydroxyethyl)-5-fluorobenzimidazole,
1,3-diethyl-5-chloro-6-fluorobenzimidazole,
1,3-diethyl-5-fluorobenzimidazole,
1-ethyl-5-cyano benzimidazole,
1-ethyl-5-carboxybenzimidazole,
1-ethyl-7-carboxybenzimidazole,
1,3-diethyl-5-carbethoxybenzimidazole,
1-ethyl-3-(p-carboxybenzyl)-5-carbethoxybenzimidazole,
1-ethyl-3-[γ-(acetylsulfonamido)propyl]-5-carbethoxybenzimidazole,
1,3-diethyy-7-carbethoxybenzimidazole,
1-ethyl-3-(β-hydroxyethyl)-7-carbethoxybenzimidazole,
1-ethyl-5-sulfonamidobenzimidazole,
1-ethyl-5-N-ethylsulfonamido benzimidaloze, etc.), and X represents an acid radical of the type used in cyanine dyes such as chloride, bromide, iodide, perchlorate, benzene sulphonate, p-tolusulphonate, methylsulphate, ethylsulphate, propyl sulphate or the like, $R'_1$, $R'_2$, $R'_3$ and $R'_4$ each represents a member selected from the group consisting of a hydrogen atom and a carbethoxy group at least one of the radicals $R'_1$, $R'_2$, $R'_3$ and $R'_4$ representing a carbethoxy group.

According to the process of our invention we prepare the cyanine dye salts represented by the Formula A starting from the benzimidazolium quaternary salts represented by the general formula:

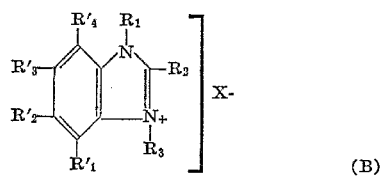

wherein $R_1$, $R_3$, $R'_1$, $R'_2$, $R'_3$, $R'_4$ and X have the same values as set forth above and $R_2$ represents a reactive group known in cyanine chemistry such as a methyl group.

The quaternary salts employed in the present invention can be obtained by treating the benzimidazole derivatives of Serial No. 58,213 filed September 26, 1960, now abandoned, which application corresponds to British Patent No. 955,961 according to the usual methods known to those skilled in the art.

The new cyanine dye salts according to the present invention may be obtained by starting from the new benzimidazolium salts by application of the usual condensation methods known to those skilled in the art.

The following description of some methods for preparing the new cyanine dye salts is not complete and therefore is not to be considered as limiting the scope of our invention but merely as a survey of the most usual condensation methods.

The new asymmetrical and symmetrical cyanine dye salts according to the present invention can be prepared by condensing a benzimidazolium salt of the general Formula B with a cyclammonium quaternary salt represented by the following formula:

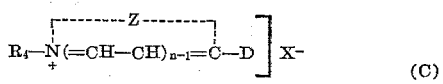

wherein $R_4$, X, Z and $n$ have the meanings set forth above and D represents a member selected from the group consisting of an alkylmercapto group, an arylmercapto group, a beta-arylaminovinyl group, a delta-arylamino-1,3-butadienyl group, a beta-alkylmercaptovinyl group, a beta-arylmercaptovinyl group or a beta-acetanilido vinyl group, which vinyl groups may carry a substituent. The condensations are advantageously carried out in the presence of a basic condensing agent, for example a trialkylamine such as triethylamine, a dialkylaniline, a heterocyclic tertiary amine such as pyridine or N-alkyl-piperidine or the like. The condensation can also be carried out in the presence of an inert diluent such as methanol, ethanol, diethylether, acetone, 1,4-dioxane, etc.

The new asymmetrical and symmetrical cyanine dye salts according to the present invention can also be prepared by condensing acetarylide intermediate represented by the following formula:

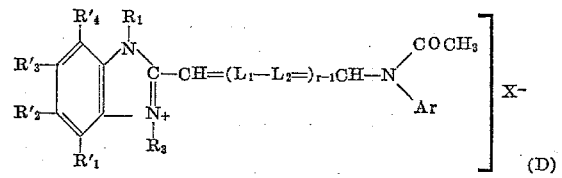

wherein $R_1$, $R_3$, $R'_1$, $R'_2$, $R'_3$, $R'_4$, X, $L_1$ and $L_2$ have the same meanings as set forth above, $r$ represents an integer from 1 to 3 and Ar represents an aryl group with cyclammonium quaternary salts containing a methyl group in α- or γ-position, such as those represented by the following general formula:

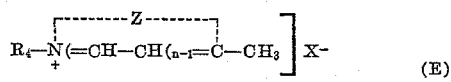

wherein $R_4$, X, Z and $n$ have the meanings set forth above.

The condensations are advantageously carried out in the presence of a basic condensing agent as set forth above.

The acetarylide intermediate represented by the Formula D can be prepared by condensing a benzimidazolium salt from those represented by Formula B with a compound represented by the following formula:

$$Ar-N=(L_1-L_2=)_{r-1}CH-NH-Ar \quad (F)$$

wherein $L_1$, $L_2$, Ar and $r$ have the meanings set forth above, and by boiling the arylaminovinyl intermediates or vinylene homologues thereof obtained with acetic anhydride.

The new symmetrical cyanine dye salts can also be prepared according to the process of our invention by condensing a benzimidazolium quaternary salt selected from those represented by formula B with an ortho-carboxylic acid alkyl ester, such as ethyl ortho-formate, advantageously in a nitrobenzene solution.

The following preparations will serve to illustrate the method for preparing the intermediate compounds for the new pomymethine dyes.

PREPARATION 1

*1,3-diethyl-2-methyl-7-carbethoxy benzimidazolium iodide*

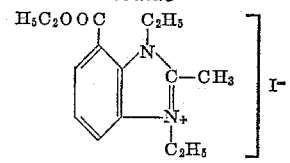

38.8 g. of 1-ethyl-2-methyl-7-carbethoxy benzimidazole prepared according to the method of Example 2 of the U.S. pending application Serial No. 58,213 filed September 26, 1960, now abandoned, and Example 13 of British Patent No. 955,961 and 31.5 g. of ethyl iodide are heated for 24 hours at 100° C., in a sealed tube, cooled and washed with ether. Yield: 68.5 g. of quaternary salt.

PREPARATION 2

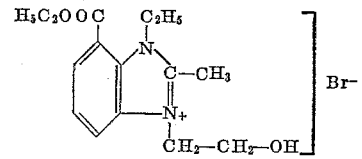

16.3 g. of 1-ethyl-2-methyl-7-carbethoxy benzimidazole and 8.75 g. of ethylene bromohydride are heated for 10 hours at 110° C., cooled and washed with acetone and ether. Yield: 19.5 g. Melting point: 150° C.

PREPARATION 3

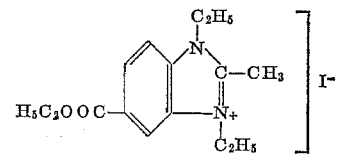

15.3 g. of 1-ethyl-2-methyl-5-carbethoxybenzimidazole and 13.6 of ethyl iodide were heated for 24 hours at 100° C., cooled and washed with ether. Yield: 23.2 g. Melting point: 186° C.

PREPARATION 4

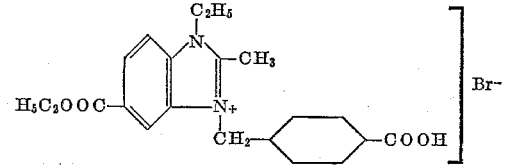

23.2 g. of 1-ethyl-2-methyl-5-carbethoxy benzimidazole and 21.5 g. of 4-carboxybenzyl bromide were heated for 24 hours at 105–110° C., cooled and washed with acetone. Yield: 25.6 g. Melting point: 243° C.

PREPARATION 5

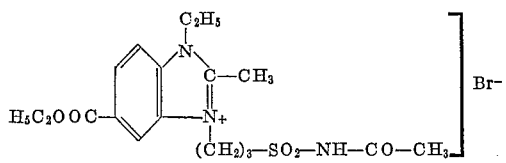

As the compound of the foregoing preparation but by using 24.4 g. of N-acetyl-3-bromo propane sulfonamide instead of 21.5 g. of 4-carboxybenzylbromide. Yield: 15.3 g. Melting point: 216° C.

The following examples illustrate the invention without limiting, however, the scope thereof.

Example 1

The dyestuff according to formula

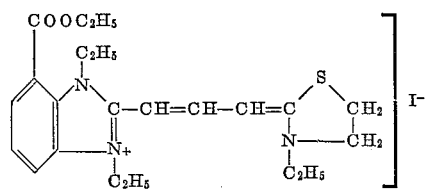

is prepared as follows: 3.9 g. of 1,3-diethyl-2-methyl-7-carbethoxylbenzimidazolium iodide obtained according to Preparation 1, 3.1 g. of 2-($\beta$-anilino vinyl)-3-ethylthiazolinium bromide, 50 cm.$^3$ of acetic anhydride and 1.4 cm.$^3$ of triethylamine were refluxed for 20 minutes. After cooling, the dyestuff was precipitated with ether and recrystallized from ethanol. Melting point: 174° C. Absorption maximum: 465 m$\mu$ (log: 4.77).

Example 2

The dyestuff according to formula

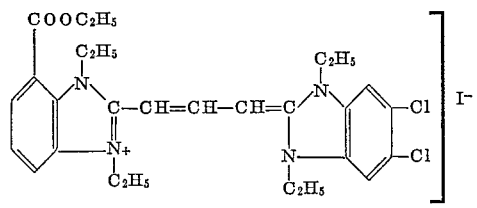

is prepared as follows: 1.9 g. of 1,3-diethyl-2-methyl-7-carbethoxybenzimidazolium iodide obtained according to Preparation 1, 2.75 g. of 1,3-diethyl-2-[$\beta$-(N-p-tolusulfonylanilino)-vinyl]-5,6-dichlorobenzimidazolium chloride, 20 cm.$^3$ of pyridine and 1.4 cm.$^3$ of triethylamine were refluxed for 45 minutes, cooled and diluted with ether. The dyestuff was recrystallized twice from ethanol. Melting point: >250° C. Absorption maximum: 517 m$\mu$ (log $\epsilon$: 529).

Example 3

The dyestuff according to formula

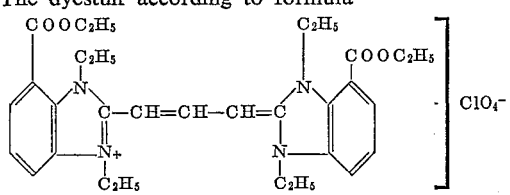

is prepared as follows: 7.9 g. of 1,3-diethyl-2-methyl-7-carbethoxybenzimidazolium iodide obtained according to Preparation 1, 7.9 g. of ethyl-ortho-formate, 25 cm.$^3$ of nitrobenzene were refluxed for 2 hrs., cooled and diluted with ether. The dyestuff was converted into perchlorate and recrystallized three times from ethanol. Melting point: 164° C. Absorption maximum: 515 m$\mu$ (log $\epsilon$: 5.22).

Example 4

The dyestuff according to formula

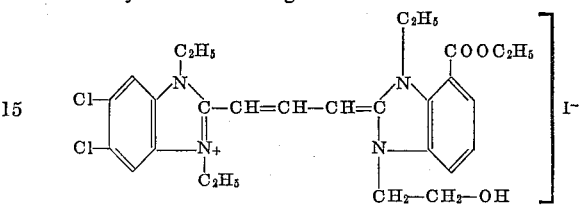

is prepared as follows: 3.6 g. of 1-ethyl-2-methyl-3-($\beta$-hydroxy-ethyl)-7-carbethoxy benzimidazolium bromide prepared according to Preparation 2, 5.5 g. of 1,3-diethyl-2 - [$\beta$-(p-tolusulfoanilido) vinyl]-5,6-dichlorobenzimidazolium chloride prepared according to the last preparation of the U.S. pending application Serial No. 62,107 filed October 12, 1960, now abandoned, refiled as Serial No. 341,445 on January 30, 1964, and 30 cm.$^3$ of nitrobenzene and 2.8 cm.$^3$ of triethylamine were refluxed for 15 minutes, cooled and diluted with ether. The precipitate was dissolved in ethanol and treated with potassium iodide. The dye was recrystallized three time from ethanol. Melting point: 226° C. Absorption maximum: 513 m$\mu$ (log $\epsilon$: 5.31).

Example 5

The dyestuff according to formula

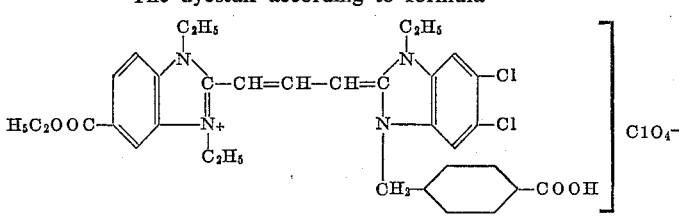

is prepared as follows: 4.3 g. of 1,3-diethyl-2-$\beta$-phenyl iminoethylidene-7-carbethoxy benzimidazoline prepared starting from the compound of Preparation 3, 5.1 g. of 1 - ethyl-2-methyl-3-(p-carboxybenzyl)-5,6-dichlorobenzimidazolium bromide, 50 cm.$^3$ of acetic anhydride and 1.6 cm.$^3$ of triethylamine were refluxed for 1 hour. The dye was precipitated with ether, converted into perchlorate and recrystallized three times from ethanol. Melting point: 240° C. Absorption maximum: 515 m$\mu$ (log $\epsilon$: 5.18).

Example 6

The dyestuff according to formula

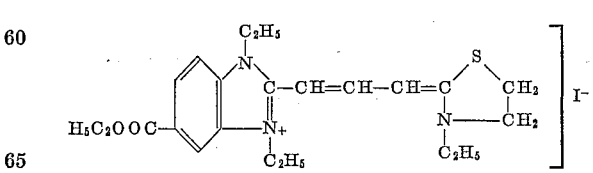

is prepared as follows: 1.55 g. of 2-($\beta$-anilinovinyl)-thiazolinium bromide, 1.95 g. of 1,3-diethyl-2-methyl-5-carbethoxy benzimidazolium iodide, 20 cm.$^3$ of acetic anhydride and 1.4 cm.$^3$ of triethylamine were refluxed for 20 minutes, cooled and the dye collected. After three recrystallizations from ethanol, a product is yielded with a melting point of 200° C. Absorption max.: 468 m$\mu$ (log $\epsilon$: 4.95).

Example 7

The dyestuff according to formula

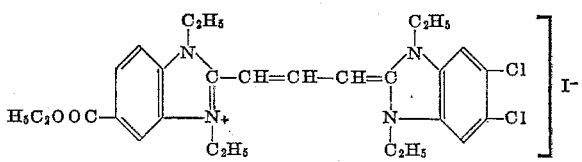

is prepared as follows: 2.75 g. of 1,3-diethyl-2-[β-(p-tolusulfonyl anilino)-vinyl]-5,6-dichloro benzimidazolium chloride, prepared according to the last preparation of the U.S. pending application Serial No. 62,107 filed October 12, 1960, now abandoned, refiled as Serial No. 341,445 on January 30, 1964, 1.95 g. of 1,3-diethyl-2-methyl-5-carbethoxy benzimidazolium iodide, prepared according to Preparation 3, 20 cm.³ of pyridine and 1.4 cm.³ of triethylamine were refluxed for 15 minutes, cooled and diluted with ether. The dye precipitated and was recrystallized from ethanol. Melting point: 170–172° C. Absorption maximum: 515 mμ (log ε: 5.36).

Example 8

The dyestuff according to formula

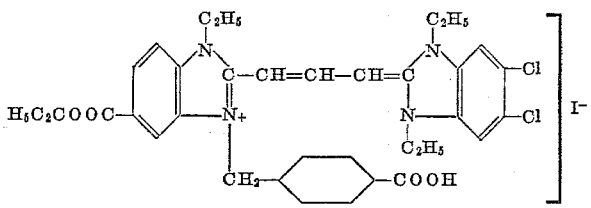

is prepared as follows: as in the foregoing example, but with 2.25 g. of 1-ethyl-2-methyl-3-(4-carboxybenzyl)-5-carbethoxy benzimidazolium bromide prepared according to Preparation 4 instead of 1.95 g. of 1,3-diethyl-2-methyl-5-carbethoxy benzimidazolium iodide and refluxing for 30 minutes. Melting point: 208° C. Absorption maximum: 517 mμ (log ε: 5.27).

Example 9

The dyestuff according to formula

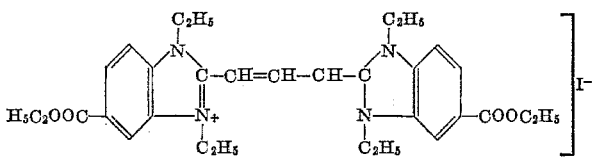

is prepared as follows: 7.8 g. of 1,3-diethyl-2-methyl-5-carbethoxy-benzimidazolium iodide, prepared according to Preparation 3, 7.8 g. of ethyloerthoformiate, 30 cm.³ of nitrobenzene were refluxed for 1½ hour, cooled and the dye precipitated with ether. Melting point: >260° C. Absorption maximum: 515 mμ (log ε: 5.37).

Example 10

The dyestuff according to formula

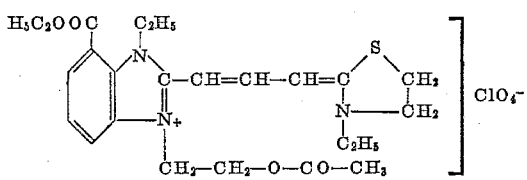

is prepared as follows: 3.6 g. of 1-ethyl-2-methyl-3-(β-hydroxyethyl)-7-carbethoxy benzimidazolium bromide, prepared according to Preparation 2, 3.1 g. of 2-(β-anilinovinyl)-3-ethylthiazolinium bromide, 30 cm.³ of acetic anhydride and 2.8 cm.³ of triethylamine were stirred for 16 hours at room temperature, refluxed for 10 minutes, cooled and diluted with ether. The dye was converted into perchlorate with sodium perchlorate and recrystallized twice from ethanol. Absorption maximum: 460 mμ.

As will be shown in the following table, the new cyanine dye salts spectrally sensitize photographic silver halide emulsions when incorporated therein. Although the new cyanine dye salts are useful especially for extending the spectral sensitivity of the customarily employed gelatino silver chloride, gelatino silver chlore-bromide, gelatino silver bromide, gelatino silver bromo-iodide and gelationo silver chloro-bromo-iodide emulsions, photographic emulsions containing water-permeable colloids other than gelatin, such as agar-agar, zeine, collodion, water-soluble cellulose derivatives, polyvinyl alcohol or other hydrophilic synthetic or natural resins or polymeric compounds, may equally well be sensitized according to the present invention.

To prepare photographic emulsions sensitized according to the invention with one or more of the new cyanine dye salts, the dye salt or salts can be incorporated in the photographic emulsion by one of the methods customarily employed in the art. In practice, it is convenient to add the dye salts to the emulsion in the form of a solution in an appropriate solvent. The dye salts are advantageously incorporated in the finished, washed emulsions and should be uniformly distributed throughout the emulsion. The concentration of the dye salts in the emulsion can vary widely, for example from 1 to 100 mg. per kg. of flowable emulsion and will vary according to the effect desired. The suitable and most economical concentration for any given emulsion will be apparent to those skilled in the art, upon making the ordinary tests and observations customarily used in the art of emulsion making.

The new cyanine dye salts can be incorporated into photographic emulsions the general sensitivity of which has been increased by physical and chemical ripening. As suitable chemical sensitizers may be mentioned the well-known sulphur sensitizers such as allylisothiocyanate, allylthuourea, sodium thiosulphate, potassium selenocyanide and the natural sensitizers originating in the gelatin, reducing sensitizers such as the imino-aminoethane sulphinic acid and the derivatives thereof, and the salts of noble metals such as gold, platinum and palladium.

The photographic emulsions optically sensitized according to the invention may further be supersensitized and/or hypersensitized by one of the methods known to those skilled in the art.

In preparing the photographic emulsions according to the invention, the usual and suitable addenda such as antifogging agents, stabilizers, antibronzing agents, hardeners, wetting agents, plasticizers, development accelerators, color couplers, fluorescent brighteners and ultra-violet screening compounds can moreover be incorporated in the emulsion in the manner customarily employed in the art. In this respect it may be mentioned that the sensitivity of the silver halide emulsions sensitized according to the process of the present invention is not adversely effected but rather enhanced by the presence therein of certain fluorescent compounds. Another advantage of the process for sensitizing silver halide emulsions according to the present invention is the compatibility of the new cyanine dye salts with anionic wetting agents and with color couplers, which is of great importance in the application of the new cyanine dye salts for sensitizing the silver halide emulsions of a light-sensitive element for color photography.

The compatibility of the new cyanine dye salts with color couplers is especially noteworthy in the case of asymmetrical carbocyanine dye salts, containing on one side of the methine chain a carbethoxy-substituted benzimidazole nucleus and on the other side a halogen substituted, more especially a dichloro-substituted benzimidazole nucleus.

Another important and valuable advantage of most of the new sensitizing dye salts is the preparation of highly sensitive photographic silver halide emulsions which give, after development and fixing of the exposed photographic element, a finished photograph which is essentially free from any residual stain.

Some of the new cyanine dye salts such as those which bear two differently or identically substituted benzimidazole nuclei, show interesting super-sensitizing properties when incorporated in silver halide emulsions.

Emulsions sensitized with the new cyanine dye salts can be coated in the usual manner on a suitable support such as glass, cellulose derivative film, resin film or paper.

The following table will serve to illustrate further the manner of practicing the invention. The optimum amounts of sensitizing dye salt have been incorporated into different portions of photographic gelatino-silver-halide emulsions prepared with varying contents and kinds of halides. The different portions of emulsions were then coated on supports and exposed in the usual manner in a spectrograph and a sensitometer through a yellow filter which transmits no light of wavelengths shorter than 510 m$\mu$, for example a filter sold under the name "Geva" No. 4 filter. The following are several examples of such emulsions together with the speed (minus blue) obtained after development of the exposed emulsion coatings in the usual manner. These speed values are calculated in relation to the speed values of respectively the same but non-sensitized emulsions.

| Dye of example— | Mg. dye per kg. emulsion | Kind of emulsion | Max./range | Total speed | Speed (minus blue) |
|---|---|---|---|---|---|
| 1 | 20 | AgCl/Br | 505/530 | 110 | |
| 2 | 30 | AgCl/Br | 580/600 | | 250 |
| 3 | 30 | AgCl/Br | 560/595 | | 130 |
| 4 | 40 | AgBr | 585/610 | | 415 |
| 5 | 20 | AgCl/Br | 575/590 | | 185 |
| 6 | 20 | AgBr | 505/540 | 155 | |
| 7 | 30 | AgBr/I | 580/595 | | 310 |
| 8 | 30 | AgCl/Br | 575/595 | | 270 |
| 9 | { 15 | AgCl | 550/585 | | 275 |
|   | { 30 | AgCl | 570/590 | | 315 |

We claim:
1. A light sensitive silver halide photographic emulsion containing as sensitizing dye a cyanine dye salt having the formula:

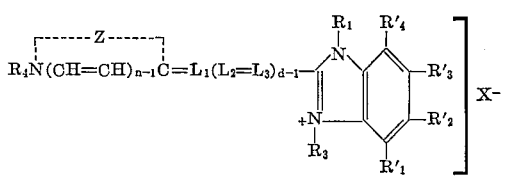

wherein $R'_1$, $R'_2$, $R'_3$ and $R'_4$ each represents a member selected from the group consisting of a hydrogen atom, a carbethoxy group, at least one of $R'_1$, $R'_2$, $R'_3$ and $R'_4$ being a carbethoxy group;
$R_1$, $R_3$ and $R_4$ each represents a member of the group consisting of alkyl, phenyl, carboxyphenyl and cyclohexyl;
$L_1$, $L_2$ and $L_3$ each represents a methine group; $n$ represents a positive integer from 1 to 2; $d$ represents a positive integer from 1 to 4; Z represents the atoms necessary to complete a heterocyclic nitrogen nucleus of the type contained in cyanine dyes and selected from the group consisting of a thiazoline nucleus, a selenazoline nucleus and a benzimidazole nucleus, and X represents an acid radical of the type used in cyanine dyes.

2. A light sensitive silver halide photographic emulsion containing as sensitizing dye a cyanine dye salt according to claim 1 wherein Z represents the atoms necessary to complete a benzimidazole nucleus wherein the hydrogen atoms in the 5 and 6-positions of the benzene ring forming part of said benzimidazole nucleus are substituted by a halogen atom.

3. The photographic emulsion of claim 1 wherein the sensitizing dye is a symmetrical dibenzimidazole-carbocyanine dye salt wherein one of the hydrogen atoms in each of the benzene rings forming part of the benzimidazole nucleus is substituted by a carbethoxy group.

4. The photographic emulsion of claim 1 wherein the sensitizing dye is an asymmetrical dibenzimidazole-carbocyanine dye salt wherein one benzimidazole nucleus is a member selected from the group consisting of a 5-carbethoxybenzimidazole nucleus and a 7-carbethoxybenzimidazole nucleus and the other benzimidazole nucleus is a 5,6-dichlorobenzimidazole nucleus.

5. The photographic emulsion of claim 1 wherein the sensitizing dye is an asymmetrical benzimidazolo-thiazoline carbocyanine dye salt wherein the benzimidazole nucleus is a member selected from the group consisting of a 5-carbethoxybenzimidazole nucleus and a 7-carbethoxybenzimidazole nucleus.

6. The light sensitive silver halide photographic emulsion of claim 1, wherein the cyanine dye is:

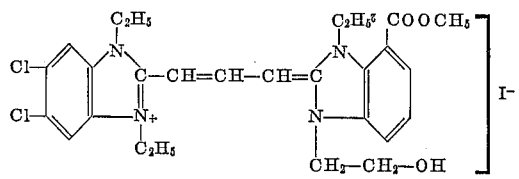

7. The light sensitive silver halide photographic emulsion of claim 1, wherein the cyanine dye is:

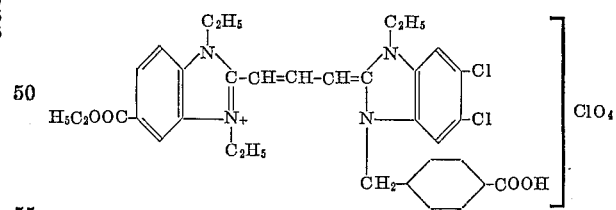

8. The light sensitive silver halide photographic emulsion of claim 1, wherein the cyanine dye is:

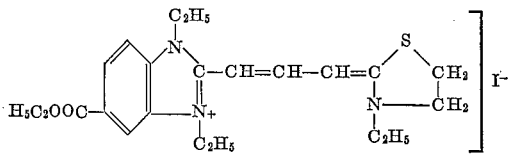

9. The light sensitive silver halide photographic emulsion of claim 1, wherein the cyanine dye is:

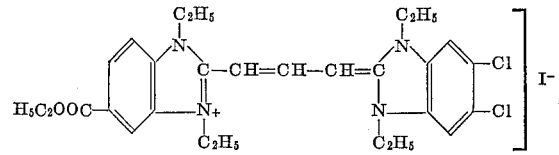

10. The light sensitive silver halide photographic emulsion of claim 1, wherein the cyanine dye is:

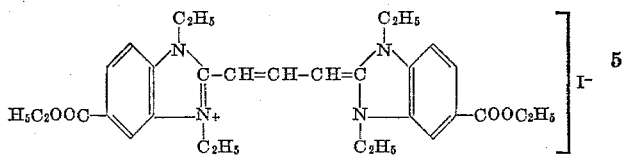

11. The photographic emulsion of claim 1, wherein alkyl is a member of the group consisting of methyl, ethyl, propyl, isopropyl, butyl, isobutyl, allyl, β-hydroxyethyl, β-acetoxyethyl, sulfoethyl, sulfopropyl, sulfobutyl, propylsulfate, butylsulfate, benzyl, carboxybenzyl, omega-acetyl sulfonamido propyl, omega-acetyl sulfonamidobutyl, and β-methyl sulfonylamino ethyl.

References Cited by the Examiner
UNITED STATES PATENTS

| | | | |
|---|---|---|---|
| 2,647,052 | 7/1954 | Martin | 96—106 |
| 2,647,053 | 7/1954 | Vinton | 96—106 |
| 2,973,264 | 2/1961 | Nys et al. | 96—106 |
| 3,090,782 | 5/1963 | Coenen et al. | 96—106 |

NORMAN G. TORCHIN, *Primary Examiner.*

J. T. BROWN, C. E. VAN HORN, *Assistant Examiners.*